(12) United States Patent
Kariya et al.

(10) Patent No.: US 9,085,103 B2
(45) Date of Patent: Jul. 21, 2015

(54) PLASTICIZING SCREW FOR INJECTION MOLDING AND INJECTION MOLDING METHOD USING SAME

(75) Inventors: Toshihiko Kariya, Tokyo (JP); Naoki Toda, Tokyo (JP); Munehiro Nobuta, Tokyo (JP)

(73) Assignee: MITSUBISHI HEAVY INDUSTRIES PLASTIC TECHNOLOGY CO., LTD., Nagoya-shi (JP)

( * ) Notice: Subject to any disclaimer, the term of this patent is extended or adjusted under 35 U.S.C. 154(b) by 19 days.

(21) Appl. No.: 13/699,858

(22) PCT Filed: Oct. 29, 2010

(86) PCT No.: PCT/JP2010/069322
§ 371 (c)(1),
(2), (4) Date: Jan. 25, 2013

(87) PCT Pub. No.: WO2012/056565
PCT Pub. Date: May 3, 2012

(65) Prior Publication Data
US 2013/0200552 A1  Aug. 8, 2013

(51) Int. Cl.
*B29C 45/47* (2006.01)
*B29C 45/17* (2006.01)
(Continued)

(52) U.S. Cl.
CPC ............ *B29C 45/1775* (2013.01); *B29C 45/47* (2013.01); *B29C 45/60* (2013.01); *B29K 2105/12* (2013.01)

(58) Field of Classification Search
CPC .. B29C 45/1775; B29C 47/605; B29C 45/60; B29C 45/47; B29C 45/50

USPC ............ 264/328.18, 349; 425/207, 208, 587; 366/81, 88, 90

See application file for complete search history.

(56) References Cited

U.S. PATENT DOCUMENTS

| 3,319,297 A | 5/1967 | Garvin et al. |
| 5,393,213 A * | 2/1995 | Murata et al. ................ 425/205 |

(Continued)

FOREIGN PATENT DOCUMENTS

| CN | 1787905 A | 6/2006 |
| CN | 201272007 Y | 7/2009 |

(Continued)

OTHER PUBLICATIONS

Mitsubishi Heavy Industries Plastic Technology, "Special screw for PP containing long glass fiber", www.mhi-pt.co.jp/injec_e/tec/screw/gf_screw/, date Nov. 8, 2006, p. 1.*

(Continued)

*Primary Examiner* — Jill Heitbrink
(74) *Attorney, Agent, or Firm* — Westerman, Hattori, Daniels & Adrian, LLP (57) ABSTRACT

A plasticizing screw for injection molding according to the present invention is a plasticizing screw for injection molding that is installed in an injection molding machine which performs injection molding by plasticizing granular thermoplastic resin feedstock containing reinforcement fibers, and includes a shaft, a flight, and a mixer. The mixer is provided in plural stages in an axial direction, and the number of fins of the mixer of each stage increases toward a leading end side in the axial direction from a rear end side in the axial direction. Further, the protrusion height of each fin from the peripheral surface of the shaft is lower than the protrusion height of the flight from the peripheral surface of the shaft.

10 Claims, 6 Drawing Sheets

(51) Int. Cl.
*B29C 45/60* (2006.01)
*B29K 105/12* (2006.01)

(56) References Cited

U.S. PATENT DOCUMENTS

| | | | |
|---|---|---|---|
| 5,653,534 A * | 8/1997 | Matsumoto et al. | 366/76.1 |
| 6,132,076 A * | 10/2000 | Jana et al. | 366/81 |
| 2007/0200263 A1 * | 8/2007 | Tazaki et al. | 264/2.5 |

FOREIGN PATENT DOCUMENTS

| | | |
|---|---|---|
| DE | 20 2006 020 302 U1 | 3/2008 |
| JP | 58-36122 U | 3/1983 |
| JP | 62-162516 A | 7/1987 |
| JP | 5-237913 A | 9/1993 |
| JP | 08-156047 A | 6/1996 |
| JP | 2000-218677 A | 8/2000 |
| JP | 2002-283421 A | 10/2002 |
| JP | 2005-169646 A | 6/2005 |

OTHER PUBLICATIONS

International Search Report of PCT/JP2010/069322, date of mailing date Dec. 21, 2010, w/ Written Opinion (Form PCT/ISA/237).

Extended European Search Report dated Apr. 1, 2014, issued in European Patent Application No. 10858953.2, (7 pages).

Anonymous: "F screw for High Viscosity Resin", Mitsubishi Heavy Industries Plastic Technology Co. Ltd., Jun. 22, 2005, cited in Extended European Search Report dated Apr. 1, 2014, issued in European Patent Application No. 10858953.2.

Anonymous: "F screw for High Viscosity Resin—Google Search", Google, Feb. 28, 2014, cited in Extended European Search Report dated Apr. 1, 2014, issued in European Patent Application No. 10858953.2.

Anonymous: "F screw", Mitsubishi Heavy Industries Plastic Technology Co., Ltd., May 10, 2005, pp. 1-2, cited in Extended European Search Report dated Apr. 1, 2014, issued in European Patent Application No. 10858953.2.

Anonymous: "F screw—Google Search", Google Feb. 28, 2014, cited in Extended European Search Report dated Apr. 1, 2014, issued in European Patent Application No. 10858953.2.

Anonymous: "Mitsubishi Electric Injection Molding Machine—em Series 720/950/1200", MHI Injection Molding Machinery, Sep. 5, 2002, pp. 1-16, cited in Extended European Search Report dated Apr. 1, 2014, issued in European Patent Application No. 10858953.2.

Chinese Office Action dated Jun. 27, 2014, issued in Chinese Patent Application No. 201080067663.5 with partial English translation (10 pages).

* cited by examiner

PLASTICIZING SCREW FOR INJECTION MOLDING AND INJECTION MOLDING METHOD USING SAME

TECHNICAL FIELD

The present invention relates to a plasticizing screw for injection molding which is provided with a mixer for agitating lumps of insufficiently melted resin at a leading end portion, and an injection molding method using the plasticizing screw for injection molding.

BACKGROUND ART

An injection molding machine which melts feedstock composed of thermoplastic resin and injects it into a mold is configured to include a screw which is accommodated in the inside of an injection cylinder. Then, as the screw, a screw with a blade-shaped flight spirally provided on the peripheral surface of a shaft which is rotationally driven has been widely used. In such a screw, solid thermoplastic resin feedstock supplied to the inside of the injection cylinder is kneaded while being melted and plasticized by receiving a shear force from the screw which rotates. Then, after the melted thermoplastic resin is accumulated in the inside of the injection cylinder at a leading end portion of the screw, the screw advances in the axial direction, whereby the melted thermoplastic resin is injected into the mold. Here, in general, at the leading end portion of the screw, a check valve for thermoplastic resin, which is called a check ring, is provided so as to be movable in the axial direction.

Incidentally, in order to improve the mechanical characteristics of a molded product, addition of reinforcement fibers to the thermoplastic resin has been widely performed. Then, in a case where the thermoplastic resin containing the reinforcement fibers is injection-molded by the above-described screw, if excessive breakage occurs in the reinforcement fibers due to plasticization and agitation by the screw, a problem arises in the quality of a molded product. Therefore, a low shear type screw by which it is possible to reduce breakage of the reinforcement fibers has been proposed in the related art (refer to, for example, PTL 1). The screw of PTL 1 is characterized by the following three points. First, the thickness at a top portion of a flight is formed to be a size in a range of 0.2 times to 0.4 times the diameter of the screw. Second, a step of less than or equal to 1 mm toward the radial direction of the screw is formed at the top portion of the flight on the leading end side of the screw. Third, the movement stroke of a check ring is set to be in a range of 5 mm to 20 mm.

However, in the screw of PTL 1, although breakage of the reinforcement fibers can be reduced, since the screw is a low shear type, compared to a case of using a general screw for resin molding, a problem of so-called insufficient dispersion arises such that disaggregation and dispersion of the reinforcement fibers in the thermoplastic resin is inferior. Therefore, as means for preventing the problem of insufficient dispersion, a so-called double flight screw provided with two flights has been used in recent years (refer to, for example, PTL 2). This double flight screw is constituted by providing a main flight over the entire axial length of the screw and also providing a sub-flight having a height lower than that of the main flight between adjacent main flights. With such a configuration, since thermoplastic resin is also agitated by the sub-flight in addition to the main flight, dispersion of the reinforcement fibers in the thermoplastic resin is promoted.

However, in the double flight screw disclosed in PTL 2, the thickness of the gap between a tip end of the sub-flight and the inner wall surface of an injection cylinder is formed to be a constant size. Therefore, if the gap thickness is set small, immediately after the thermoplastic resin is input from a feedstock input port (a hopper), softening of the thermoplastic resin is insufficient at a rear end portion of the screw. Therefore, the gap between a tip end in the radial direction of the sub-flight and the inner wall surface of the injection cylinder is clogged with the thermoplastic resin, whereby plasticization defects (resin transportation defects) occur. Further, at the rear end portion of the screw where softening of the thermoplastic resin is insufficient, the thermoplastic resin cannot absorb the shear force that it receives from the screw through bending deformation. Therefore, if the thermoplastic resin is subjected to a large shear force between the tip end in the radial direction of the sub-flight and the inner wall surface of the injection cylinder, the shear force is also propagated to the reinforcement fibers as is, and thus excessive breakage occurs in reinforcement fibers. In addition, in the present invention, the hopper side that is upstream side in the resin transportation by the screw is expressed as a screw rear-end portion (or a screw rear-end side) and the downstream side is expressed as a screw leading-end portion (or a screw leading-end side).

On the other hand, if the gap thickness is set large, breakage of the reinforcement fibers at the screw rear-end portion can be suppressed. However, since a shear force and a stretching force which are loaded to the thermoplastic resin sufficiently softened due to a rise of temperature at the screw leading-end portion between the tip end in the radial direction of the sub-flight and the inner wall surface of the injection cylinder are absorbed by deformation of the softened thermoplastic resin, the shear force and the stretching force cannot be effectively loaded to the reinforcement fibers which are suspended in the inside of the thermoplastic resin. Therefore, disaggregation defects or dispersion defects occurs in the reinforcement fibers contained in the thermoplastic resin.

Incidentally, as other means for preventing the problem of insufficient dispersion that a screw generally has, a method that a so-called mixer is provided in plural stages in the axial direction at a leading end portion of the screw has been proposed in the related art (refer to, for example, PTL 3). In the mixer, a plurality of fins protruding in the radial direction is provided at regular intervals in the circumferential direction.

CITATION LIST

Patent Literature

[PTL 1] Japanese Patent Application, First Publication No. 2005-169646
[PTL 2] Japanese Patent Application, First Publication No. 2002-283421
[PTL 3] Japanese Patent Application, First Publication No. H5-237913

SUMMARY OF INVENTION

Technical Problem

However, even if the screw disclosed in PTL 3 is applied as a countermeasure against insufficient dispersion of the reinforcement fibers, even though the problem of insufficient dispersion of the reinforcement fibers can be reduced, in a case where the thermoplastic resin has entered between the outer circumferential surface of the mixer and the inner wall surface of the injection cylinder, a problem arises of excessive breakage of the reinforcement fibers due to being crushed by the outer circumferential surface of the mixer.

The present invention has been made in view of such circumstances and has an object of providing, in a screw with a mixer applied thereto in plural stages in the axial direction for improvement in dispersion of the reinforcement fibers, means for reducing occurrence of excessive breakage in reinforcement fibers contained in thermoplastic resin between an outer circumferential surface of the mixer and the inner wall surface of an injection cylinder.

Solution to Problem

A plasticizing screw for injection molding according to the invention is installed in an injection molding machine which performs injection molding by plasticizing granular thermoplastic resin feedstock containing reinforcement fibers, and includes a shaft which is rotationally driven, a flight spirally provided on the peripheral surface of the shaft, and a mixer which is provided further to the leading end side in the axial direction than the flight and has a plurality of fins radially protruding from the peripheral surface of the shaft and provided in a circumferential direction.

The mixer is provided in a plurality of stages in an axial direction, and the number of fins of the mixer of each stage increases toward the leading end side in the axial direction from the rear end side in the axial direction. Further, the protrusion height of each fin from the peripheral surface of the shaft is lower than the protrusion height of the flight from the peripheral surface of the shaft.

According to such a configuration, in the mixer provided on the rear end side in the axial direction of the screw, the number of fins is small and a wide gap is secured between the fins. Therefore, even in a case where lumps of insufficiently melted resin is present in the thermoplastic resin reaching the mixer, the lumps are deformed or broken without causing clogging, between the fins and then sent to the leading end side in the axial direction. Then, the lumps of the insufficiently melted resin is further deformed or finely broken while sequentially passing the fins which are provided on the downstream side in the axial direction and whose number is large. In this way, dispersion of the reinforcement fibers in the thermoplastic resin is promoted.

Further, since the protrusion height of each fin is lower than the protrusion height of the flight, even if a tip end portion in the radial direction of the flight is close to the inner wall surface of an injection cylinder to the extent of coming into contact therewith, a wide gap is secured between the outer circumferential surface of the mixer and the inner wall surface of the injection cylinder. In this way, even if the thermoplastic resin enters between the outer circumferential surface of the mixer and the inner wall surface of the injection cylinder, the reinforcement fibers can be prevented from being excessively broken by being crushed between the outer circumferential surface of the mixer and the inner wall surface of the injection cylinder.

Further, in the plasticizing screw for injection molding according to the invention, a step in a radial direction may be provided at a tip end portion in the radial direction of the flight such that a screw leading-end side of the step is lowered.

In such a configuration, since the tip end portion in the radial direction of the flight is low on the screw leading-end side, that is, the gap between the inner wall surface of the injection cylinder and the tip end portion in the radial direction of the flight is large, the thermoplastic resin in a molten state easily enters the gap. Therefore, even if the tip end portion in the radial direction of the flight approaches is close to the inner wall surface of an injection cylinder to the extent of coming into contact therewith, since the flight is pushed back by the pressure of the thermoplastic resin in a molten state entering between the two, contact between the two is suppressed. In this way, even if the reinforcement fibers enter between the tip end portion in the radial direction of the flight and the inner wall surface of the injection cylinder, the reinforcement fibers can be suppressed from being crushed by the tip end portion in the radial direction of the flight.

Further, in the plasticizing screw for injection molding according to the invention, the mixer may be provided in three or more stages in the axial direction, and where the number of fins of the mixer of the first stage which is located on the rearmost end side in the axial direction is set to be N, the number of fins of the mixer of the second stage which is located next rear end side of the first stage in the axial direction may be in a range of more than 1.5N and less than 2.5N, and the number of fins of the mixer of the third stage or later which is located further to the tip end side in the axial direction than the second stage may be more than 3N.

In such a configuration, lumps of insufficiently melted resin which are presents in the thermoplastic resin are moderately deformed or broken by the mixer which is provided on the rear end side in the axial direction and whose number of fins is small. Then, the lumps are further deformed or finely broken by the mixer which is provided on the leading end side in the axial direction and whose number of fins is large. In this way, dispersion of the reinforcement fibers in the thermoplastic resin is promoted moderately.

Further, in the plasticizing screw for injection molding according to the invention, the protrusion heights of the fins from the peripheral surface of the shaft may be different for the respective fins in the circumferential direction.

In such a configuration, since the protrusion heights of fins are different for the respective fins in the circumferential direction, swirl flow of the thermoplastic resin between the fins, which is generated by the rotation of the screw, is complex, and thus dispersion of the reinforcement fibers is promoted. Further, since in a portion whose protrusion height of the fin is low and the gap between the fin and the injection cylinder is large, the flow of the thermoplastic resin is strong, even in a case where large lumps of insufficiently melted resin are present in the thermoplastic resin, the large lumps are swept away by the fins whose protrusion heights are low. For this reason, even the large lumps are reliably deformed or finely broken without causing clogging between the fins.

Further, in the plasticizing screw for injection molding according to the invention, an inclined surface whose separation distance from the peripheral surface of the shaft increases toward the leading end side in the axial direction from the rear end side in the axial direction may be formed at a rear end portion in the axial direction of the fin.

In such a configuration, the thermoplastic resin entering the gap between the leading end portion in the radial direction of the fin and the inner wall surface of the injection cylinder smoothly flows toward the leading end side in the axial direction from the rear end side in the axial direction by being guided by the inclined surface. Further, lumps of insufficiently melted thermoplastic resin flow along the inclined surface or hit against the inclined surface, thereby being broken. Furthermore, swirl flow of the thermoplastic resin between the fins, which is generated by the rotation of the screw, is complex, and thus dispersion of the reinforcement fibers is promoted. In this way, clogging of the gap with the thermoplastic resin can be prevented before it happens.

Further, in the plasticizing screw for injection molding according to the invention, a radial distance from a valley portion of the fin to a tip end portion in the radial direction of the flight may be a size greater than or equal to twice the outer diameter of the granular thermoplastic resin feedstock.

In such a configuration, even if the tip end portion in the radial direction of the flight is close to the inner wall surface of the injection cylinder to the extent of coming into contact with each other, the width of a gap which is formed between the valley portion of the fin and the inner wall surface of the injection cylinder has a size greater than or equal to twice the outer diameter of the thermoplastic resin feedstock. Therefore, even lumps in which insufficiently melted thermoplastic resin feedstock is doubly stacked can pass through the mixer without clogging the gap.

Further, in the plasticizing screw for injection molding according to the invention, the flight may be a single flight which forms only one line is provided on the peripheral surface of the shaft.

In such a configuration, by using the screw provided with a single flight, which is effective in suppressing breakage of the reinforcement fibers, but inferior in dispersibility, it is possible to keep breakage of the reinforcement fibers to a minimum and also to improve the degree of dispersion of the reinforcement fibers. Further, compared to a case of using a double flight screw, occurrence of excessive breakage in the reinforcement fibers can be prevented by reducing the shear force that the thermoplastic resin receives. However, in a case of prioritizing dispersion over the degree of breakage of the reinforcement fibers, the double flight screw may also be used.

Further, an injection molding method according to the invention includes a process of plasticizing thermoplastic resin feedstock containing reinforcement fibers by using a plasticizing screw for injection molding, and a process of injecting the plasticized thermoplastic resin feedstock into a cavity of a mold.

The plasticizing screw for injection molding includes a shaft which is rotationally driven, a flight spirally provided on the peripheral surface of the shaft, and a mixer which is provided further to the leading end side in the axial direction than the flight and has a plurality of fins radially protruding from the peripheral surface of the shaft and provided in a circumferential direction.

The mixer is provided in plural stages in an axial direction, and the number of fins of the mixer of each stage increases toward leading end side in the axial direction from a rear end side in the axial direction. Further, the protrusion height of each fin from the peripheral surface of the shaft is lower than the protrusion height of the flight from the peripheral surface of the shaft.

In such a method, even in a case where lumps of insufficiently melted molten resin are present in the thermoplastic resin which has passed through the flight, the lumps are deformed or finely broken while sequentially passing the mixer on the leading end side in the axial direction in which the number of fins is large, from the mixer on the rear end side in the axial direction in which the number of fins is small. In this way, a molded product can be obtained in which the fiber lengths of the contained reinforcement fibers are long and dispersion of the reinforcement fibers is good.

Further, since the protrusion height of each fin is lower than the protrusion height of the flight, a wide gap is secured between the outer circumferential surface of the mixer and the inner wall surface of the injection cylinder. In this way, the same operation and effects as those of the invention according to claim 1 are obtained.

Further, in the injection molding method according to the invention, the reinforcement fiber may include at least one of a glass fiber, a carbon fiber, a metal fiber, and a natural fiber.

In such a method, it is possible to make a molded product obtained by injection molding have thin thickness and lightweight properties, high mechanical strength, and recyclability. In particular, if a carbon fiber or a metal fiber is adopted, a reduction in weight of a molded product can be attained and also, in a case of using a molded product as an outer covering member such as a body member of a vehicle, a cover for housing electrical equipment, or the like, since conductivity can be provided to the outer covering member, the cover, or the like, it is possible to protect a passenger or the electrical equipment from a great current at the time of a lightning strike. Further, by adopting a natural fiber and combining it with especially organism-derived resin such as polylactic acid, it is possible to provide a molded product with a smaller burden on global environment.

Advantageous Effects of Invention

According to the invention, by preventing occurrence of excessive breakage in the reinforcement fibers contained in the thermoplastic resin between the outer circumferential surface of the mixer and the inner wall surface of the injection cylinder, it is possible to attain improvement in the quality of a molded product, such as preventing variation in the strength or the weight of the molded product or improving external appearance by preventing exposure of the reinforcement fibers on the surface of the molded product.

BRIEF DESCRIPTION OF DRAWINGS

FIG. 5 is a diagram showing the cross-sections of the respective portions of FIG. 4, wherein FIG. 5(a) is a diagram showing an A-A cross-section, FIG. 5(b) is a diagram showing a B-B cross-section, and FIG. 5(c) is a diagram showing a C-C cross-section.

DESCRIPTION OF EMBODIMENTS

First Embodiment

Figure 1:
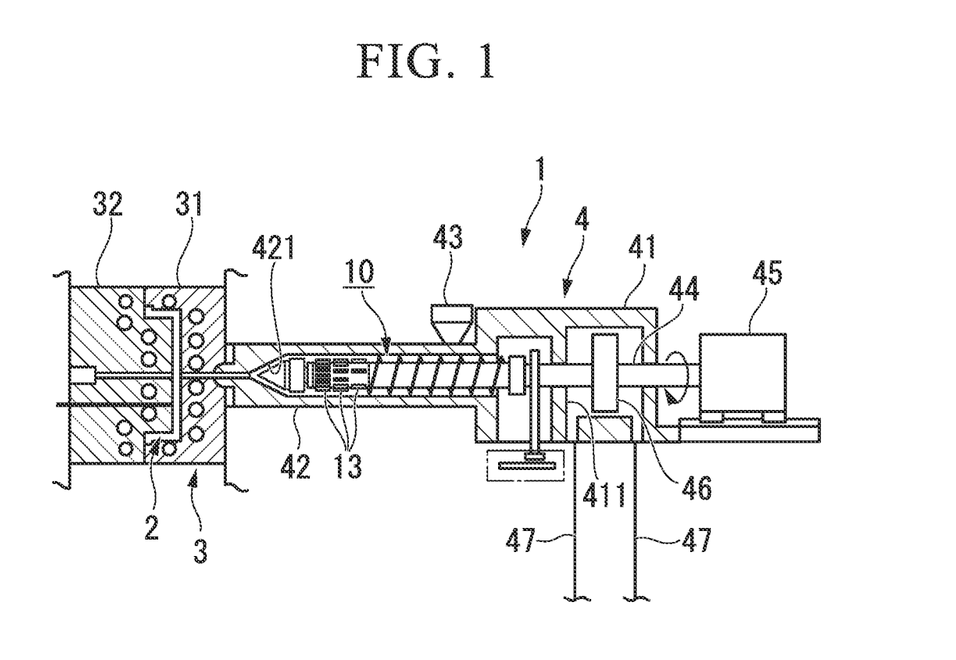
FIG. 1 is a schematic diagram showing the overall configuration of an injection molding machine provided with a plasticizing screw for injection molding related to a first embodiment of the invention.

Hereinafter, embodiments of the invention will be described with reference to the drawings. First, the configuration of a plasticizing screw for injection molding related to a first embodiment of the invention will be described. FIG. 1 is a schematic diagram showing the overall configuration of an injection molding machine 1 provided with a plasticizing screw for injection molding 10 (hereinafter simply referred to as a "screw 10" for brevity) related to the first embodiment.

The injection molding machine 1 includes a mold unit 3 with a cavity 2 formed in the inside, and an injection unit 4 for injecting thermoplastic resin into the cavity 2, as shown in FIG. 1.

The mold unit 3 includes a fixed mold 31 provided immovably and a movable mold 32 provided so as to be able to move with respect to the fixed mold 31, as shown in FIG. 1. Then, the cavity 2 is formed between a concave portion of the fixed mold 31 and a convex portion of the movable mold 32 which are provided so as to face each other.

The injection unit 4 includes a unit main body 41, an injection cylinder 42, the screw 10, a hopper 43, a connecting shaft 44, a motor 45, a piston 46, and a hydraulic piping 47. A hydraulic oil cylinder 411 is formed in the inside of the unit main body 41. The injection cylinder 42 extends from the unit main body 41 and a leading end portion of the injection cylinder 42 is connected to the fixed mold 31. The screw 10 is accommodated in the inside of the injection cylinder 42 and the hopper 43 is provided at an upper portion of the injection cylinder 42. The connecting shaft 44 is connected to a rear end portion of the screw 10 and rotationally driven by the motor 45. The piston 46 is accommodated in the inside of the hydraulic oil cylinder 411 and fixed to the connecting shaft 44. The hydraulic piping 47 is connected to the hydraulic oil cylinder 411.

Figure 2:
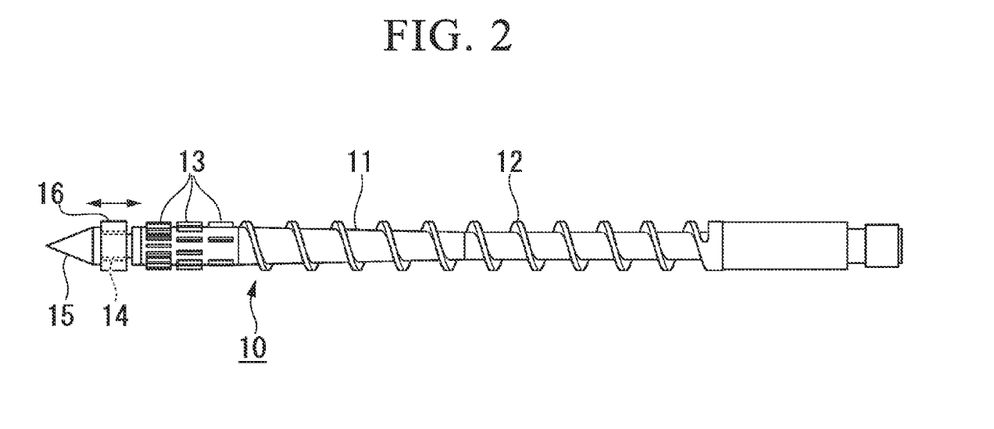
FIG. 2 is a schematic front view showing the external appearance of the screw related to the first embodiment of the invention.

Here, FIG. 2 is a schematic front view showing the external appearance of the screw 10. The screw 10 includes a shaft 11, a flight 12, a mixer 13, a small-diameter shaft 14, a screw tip 15, and a check ring 16.

The shaft 11 has a long cylindrical shape, as shown in FIG. 2, and the small-diameter shaft 14 having a diameter smaller than the shaft 11 extends in an axial direction from a leading end portion of the shaft 11. Then, the screw tip 15 having an approximately conic shape is provided at a leading end of the small-diameter shaft 14. Further, the check ring 16 has a ring shape and the inner diameter thereof is formed to be a diameter slightly larger than the small-diameter shaft 14. The small-diameter shaft 14 is inserted into the check ring 16, whereby the check ring 16 is movable along the small-diameter shaft 14. Further, the flight 12 is provided so as to protrude in a radial direction from the shaft 11 and spirally wind around the peripheral surface of the shaft 11, as shown in FIG. 2.

Figure 3:
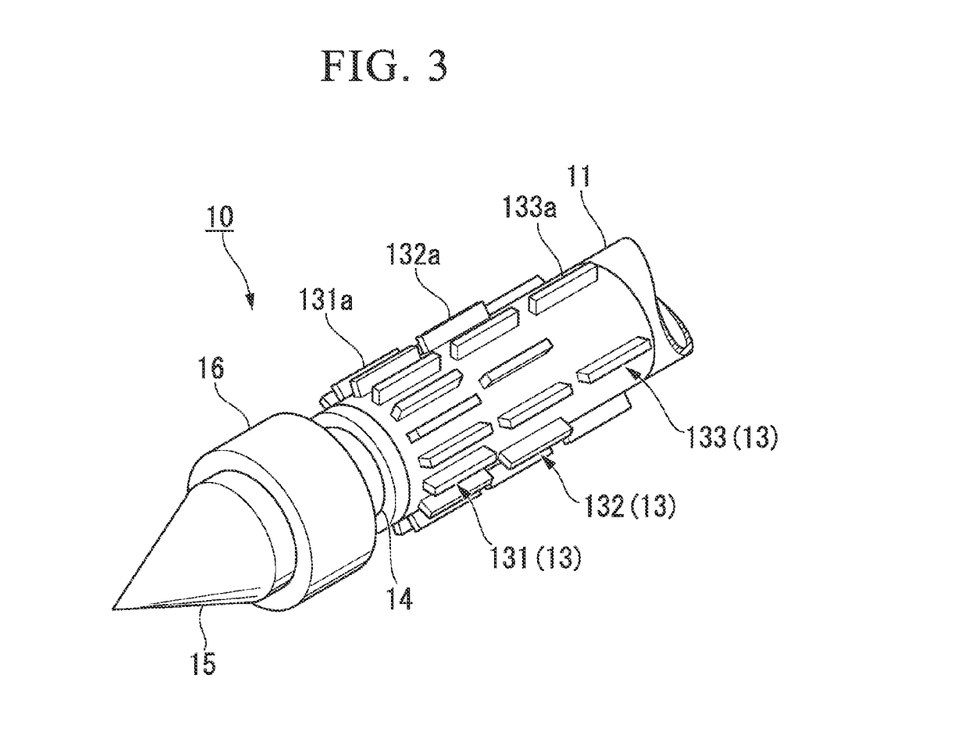
FIG. 3 is an enlarged schematic perspective view of a leading end portion of a shaft related to the first embodiment of the invention.
Figure 4:
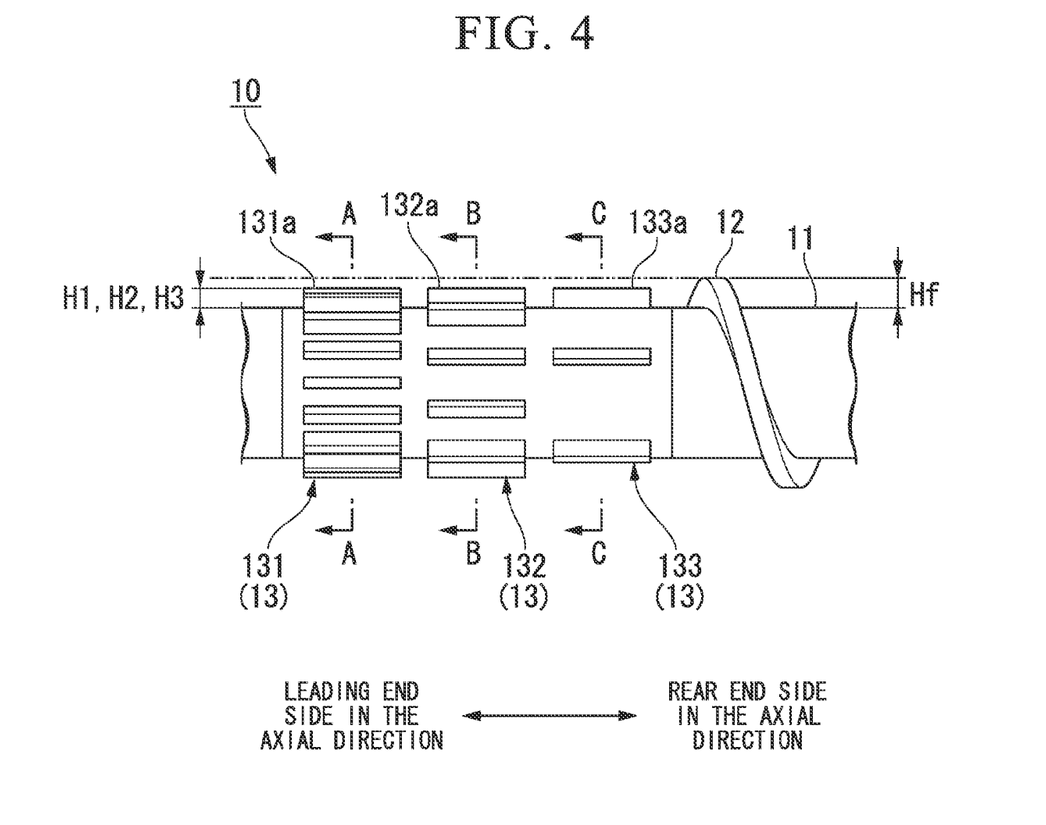
FIG. 4 is an enlarged schematic front view of the leading end portion of the shaft related to the first embodiment of the invention.

Further, FIGS. 3 and 4 are enlarged diagrams of a leading end portion of the shaft 11, wherein FIG. 3 is a schematic perspective view and FIG. 4 is a schematic front view. In addition, in FIG. 4, for convenience of explanation, illustration of the screw tip 15 is omitted.

The mixer 13 is for breaking and agitating lumps of insufficiently melted resin which is present in the thermoplastic resin passed through the flight 12. The mixer 13 is provided in an area further on the leading end side in the axial direction than the flight 12 on the peripheral surface of the shaft 11, as shown in FIG. 2. The mixer 13 is provided in three stages along the axial direction and more specifically, includes a first mixer 131 provided on the most leading end side, a second mixer 132 provided on the next leading end side, and a third mixer 133 provided on the rearmost end side.

Figure 5:
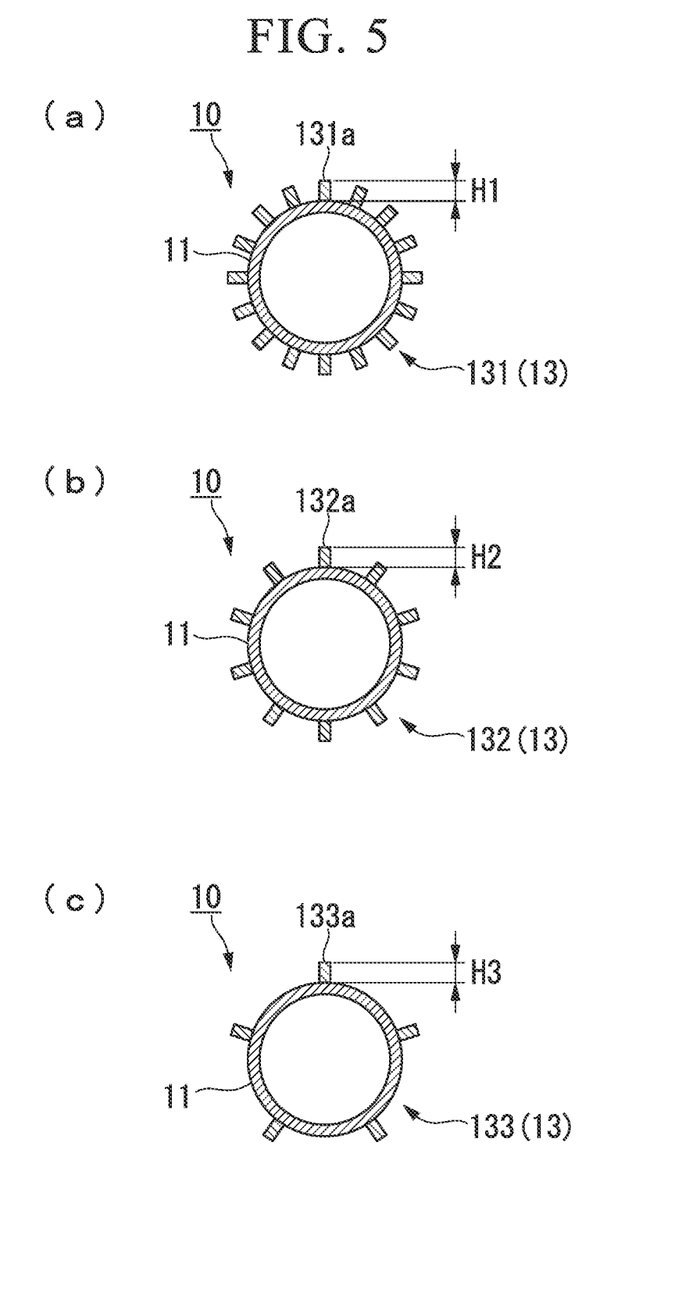

Here, FIG. 5 is a diagram showing the cross-sections of the respective portions of FIG. 4, wherein FIG. 5(a) is a diagram showing an A-A cross-section, FIG. 5(b) is a diagram showing a B-B cross-section, and FIG. 5(c) is a diagram showing a C-C cross-section. The first mixer 131 has sixteen first fins 131a radially protruding from the peripheral surface of the shaft 11 and provided at regular intervals in a circumferential direction, as shown in FIG. 5(a). Each of the first fins 131a has an approximately rectangular parallelepiped shape, as shown in FIG. 3, and is fixed to the peripheral surface of the shaft 11 such that a longitudinal direction thereof is directed in the axial direction of the shaft 11. Then, the sixteen first fins 131a are formed such that protrusion heights H1 from the peripheral surface of the shaft 11 are the same, as shown in FIG. 5(a), and the protrusion height H1 is set lower than a protrusion height Hf of the flight 12, as shown in FIG. 4.

The second mixer 132 has ten second fins 132a provided to radially protrude from the peripheral surface of the shaft 11 and provided at regular intervals in the circumferential direction, as shown in FIG. 5(b). Each of the second fins 132a also has an approximately rectangular parallelepiped shape, as shown in FIG. 3, and is fixed to the peripheral surface of the shaft 11 such that a longitudinal direction thereof is directed in the axial direction of the shaft 11. Further, the ten second fins 132a are formed such that protrusion heights H2 from the peripheral surface of the shaft 11 are the same, as shown in FIG. 5(b). Then, the protrusion height H2 of the second fin 132a is set to be approximately equal to the protrusion height H1 of the first fin 131a and lower than the protrusion height Hf of the flight 12, as shown in FIG. 4.

The third mixer 133 has five third fins 133a provided to radially protrude from the peripheral surface of the shaft 11 and provided at regular intervals in the circumferential direction, as shown in FIG. 5(c). Each of the third fins 133a also has an approximately rectangular parallelepiped shape, as shown in FIG. 3, and is fixed to the peripheral surface of the shaft 11 such that a longitudinal direction thereof is directed in the axial direction of the shaft 11. Further, the five third fins 133a are also formed such that protrusion heights H3 from the peripheral surface of the shaft 11 are the same, as shown in FIG. 5(c). Then, the protrusion height H3 of the third fin 133a is set to be approximately equal to the protrusion height H1 of the first fin 131a and the protrusion height H2 of the second fin 132a and lower than the protrusion height Hf of the flight 12, as shown in FIG. 4.

In this manner, the numbers of first fins 131a to third fins 133a of the first mixer 131 to the third mixer 133 are set so as to increase toward the first mixer 131 on the leading end side in the axial direction from the third mixer 133 on the rear end side in the axial direction. More specifically, where the number of third fins 133a of the third mixer 133 which is located on the rearmost end side in the axial direction is set to be N, the number of second fins 132a of the second mixer 132 which is located on the next rearmost end side in the axial direction is set to be in a range of more than 1.5N and less than 2.5N. In this embodiment, the third fin 133a is set to be five (N=5), whereby the second fin 132a is set to be ten that is in a range of more than 7.5 (=1.5N) and less than 12.5 (=2.5N).

Further, the number of first fins 131a of the first mixer 131 which is located further to the leading end side in the axial direction than the second mixer 132 is set more than 3N. In this embodiment, the number of the third fins 133a is set to be five (N=5), whereby the number of the first fin 131a is set to be sixteen that is more than fifteen (=3N).

Further, as shown in FIG. 4, a radial distance from a valley portion of the first fin 131a to a tip end portion in the radial direction of the flight 12, that is, the protrusion height Hf of the flight 12 in this embodiment is made to be a size greater than or equal to twice the outer diameter of the thermoplastic resin feedstock which will be described later. Similarly, a radial distance from a valley portion of the second fin 132a to the tip end portion in the radial direction of the flight 12 and a radial distance from a valley portion of the third fin 133a to the tip end portion in the radial direction of the flight 12 are also made to be approximately equal to the protrusion height Hf of the flight 12 in this embodiment and be a size greater than or equal to twice the outer diameter of the thermoplastic resin feedstock which will be described later.

Next, description will be made with regard to a procedure for an injection molding method using the screw 10 related to the first embodiment of the invention and the operation and effects thereof. First, the hopper 43 constituting the injection unit 4 shown in FIG. 1 is filled with solid thermoplastic resin feedstock (not shown) containing glass fibers or carbon fibers. In this state, when the motor 45 starts the driving of the connecting shaft 44, the screw 10 connected to the connecting shaft 44 starts to rotate. Then, when the thermoplastic resin feedstock is supplied from the hopper 43 to the injection cylinder 42, the thermoplastic resin feedstock is transported to the leading end side in the axial direction while being melted and plasticized by the flight 12.

Then, the thermoplastic resin which has passed through the flight 12 and entered a molten state is further transported to the leading end side in the axial direction and reaches the third mixer 133. Here, as described above, the number of the third fins 133a of the third mixer 133 is five which is small and a wide gap is secured between the third fins 133a. Therefore, even in a case where lumps of insufficiently melted resin are present in the thermoplastic resin which has passed through the flight 12, the lumps are deformed or broken by passing through the gap between the third fins 133a without clogging the gap.

Thereafter, the lumps of the insufficiently melted resin reach the second mixer 132 provided on the downstream side in the axial direction of the third mixer 133. Here, the number of the second fins 132a of the second mixer 132 is ten and more than that of the third mixer 133. The gap between the second fins 132a is made narrower than the gap between the third fins 133a. Therefore, the lumps of the insufficiently melted resin are further deformed or finely broken by passing through the gap between the second fins 132a.

In addition, the lumps of the insufficiently melted resin reach the first mixer 131 provided on the downstream side in the axial direction of the second mixer 132. Here, the number of the first fins 131a of the first mixer 131 is sixteen and even more than that of the second mixer 132. The gap between the first fins 131a is made even narrower than the gap between the second fins 132a. Therefore, the lumps of the insufficiently melted resin are further deformed or finely broken by passing through the gap between the first fins 131a. In this manner, while the lumps of the insufficiently melted resin pass the first mixer 131 via the second mixer 132 from the third mixer 133, the lumps of the insufficiently melted resin are finely broken, whereby dispersion of the reinforcement fibers in the thermoplastic resin is promoted.

Further, as described above, all the protrusion heights H1 to H3 of the first fins 131a to the third fins 133a of the first mixer 131 to the third mixer 133 are set lower than the protrusion height Hf of the flight 12. Therefore, even if the tip end portion in the radial direction of the flight 12 is close to the inner wall surface 421 of the injection cylinder 42 to the extent of coming into contact therewith, a wide gap is secured between each of the tip end portions in the radial direction of the first fin 131a to the third fin 133a and the inner wall surface 421 of the injection cylinder 42. In this way, even if the thermoplastic resin enters the gap between the first fin 131a to the third fin 133a and the inner wall surface 421 of the injection cylinder 42, the reinforcement fibers can be prevented from being subjected to a large shear force, thereby being excessively broken.

Thereafter, the thermoplastic resin in a molten state which has passed through the mixer 13 reaches the check ring 16 shown in FIG. 3. At this time, the check ring 16 is pressed against the screw tip 15 by the thermoplastic resin in a molten state. In this way, a gap is formed between the shaft 11 and the check ring 16. The thermoplastic resin in a molten state passes through the gap between the shaft 11 and the check ring 16, the gap (not shown) between the check ring 16 and the small-diameter shaft 14, and the gap between the check ring 16 and the injection cylinder 42 shown in FIG. 1 and is then accumulated in a leading end portion of the injection cylinder 42.

Then, when hydraulic oil (not shown) is supplied from the hydraulic piping 47 to the hydraulic oil cylinder 411, the piston 46 moves to the mold unit 3 side in the inside of the hydraulic oil cylinder 411, and accordingly, the screw 10 advances in the axial direction in the inside of the injection cylinder 42.

At this time, the check ring 16 which has been pressed against the screw tip 15 moves in the axial direction, that is, to the shaft 11 side and then comes into contact with the shaft 11, thereby blocking the gap between the shaft 11 and the check ring 16, and thus the thermoplastic resin in a molten state is prevented from flowing back to the shaft 11 side through the gap.

In this way, the thermoplastic resin in a molten state accumulated in the leading end portion of the injection cylinder 42 is pressed and injected by the screw 10, thereby being filled in the cavity 2 of the mold unit 3.

By setting the axial movement stroke of the check ring 16 to be greater than or equal to a desired weight-average fiber length of the reinforcement fiber, it is possible to make the weight-average fiber lengths of residual fibers in a molded product be greater than or equal to a desired length.

Then, after the thermoplastic resin is cooled and solidified, a molded product is taken out by separating the movable mold 32 from the fixed mold 31. At this time, an injection operation may be driven by an electromotive drive which is a combination of an electric motor and a ball screw, or the like, instead of being driven by hydraulic pressure.

In addition, the shape or the size of each of the first fin 131a to the third fin 133a of the first mixer 131 to the third mixer 133 is not limited to that in this embodiment and a design change can be made appropriately. For example, the first fin 131a to the third fin 133a illustrated in this embodiment are provided in a direction parallel to the central axis of the mixer 13. However, the first fin 131a to the third fin 133a may also be provided to be inclined in the same direction as the flight 12 with respect to the central axis. That is, since a resin transportation force can be provided to the first fin 131a to the third fin 133a similarly to the flight 12 by inclining the first fin 131a to the third fin 133a in the same direction as the flight 12, flow resistance (equivalent to back pressure) of the thermoplastic resin which is discharged from the screw 10 can be reduced. In this way, since the resin discharge capability (plasticization capability) of the screw 10 as a whole is improved, and thus a time (plasticization time) during which the reinforcement fibers are kneaded and agitated in the screw 10 can be shortened, it is effective in suppressing breakage of the reinforcement fibers. Further, the numbers of first fins 131a to third fins 133a increases toward the leading end side in the axial direction from the rear end side in the axial direction and can be arbitrarily changed within a range satisfying the relationships described above.

Second Embodiment

Figure 6:
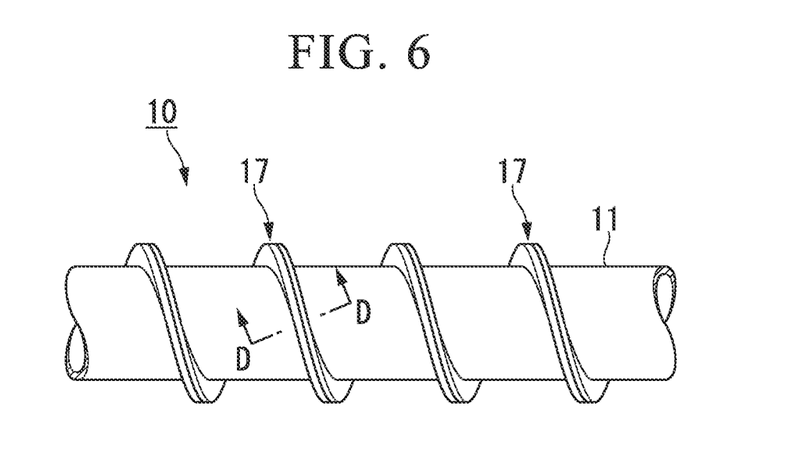
FIG. 6 is an enlarged schematic front view of a peripheral portion of a flight regarding a screw related to a second embodiment of the invention.

Next, the configuration of a plasticizing screw for injection molding 10 (hereinafter simply referred to as a "screw 10" for brevity) related to a second embodiment of the invention will be described. FIG. 6 is an enlarged schematic front view of a peripheral portion of a flight 17 regarding the screw 10 related to the second embodiment. If the screw 10 related to the second embodiment is compared with the screw 10 related to the first embodiment, only the configuration of the flight 17 is different. Since the other configurations are the same as those in the first embodiment, the same reference numerals are used and a description thereof is omitted here.

Figure 7:
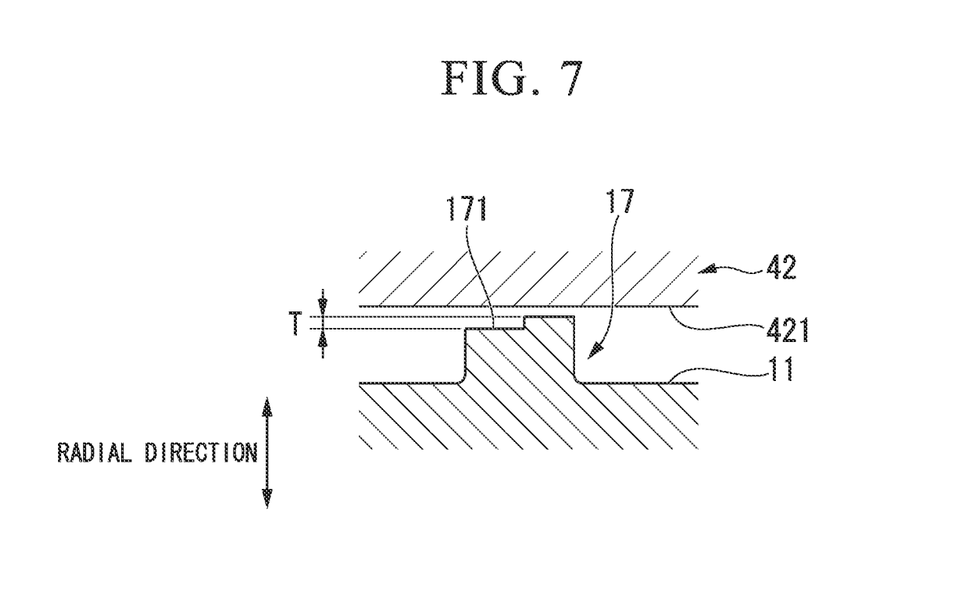
FIG. 7 is a schematic cross-sectional view showing a D-D cross-section in FIG. 6.

Here, FIG. 7 is a schematic cross-sectional view showing a D-D cross-section in FIG. 6. In the flight 17 of this embodiment, a step in the radial direction is provided at a tip end portion in the radial direction thereof. That is, at the tip end portion in the radial direction of the flight 17, a step portion 171 is formed by partially cutting out the leading end side in the axial direction. Then, the upper surface of the step portion 171 is lowered by a step length T in the radial direction, compared to the circumference.

In such a configuration, since the screw leading-end side of the flight 17 is lowered, that is, the gap between the inner wall surface 421 of the injection cylinder 42 and the step portion 171 of the flight 17 is made large, it is easy for the thermoplastic resin in a molten state to enter the gap. In this way, as shown in FIG. 7, even if the leading end portion in the radial direction of the flight 17 is close to the inner wall surface 421 of the injection cylinder 42 to the extent of coming into contact with the inner wall surface 421 of the injection cylinder 42, the flight 17 is pushed back by the pressure of the thermoplastic resin in a molten state entering between the inner wall surface 421 of the injection cylinder 42 and the step portion 171 of the flight 17, whereby contact between the inner wall surface 421 of the injection cylinder 42 and the flight 17 is suppressed. In this way, even if the reinforcement fibers enter the gap between the inner wall surface 421 of the injection cylinder 42 and the flight 17, crush of the reinforcement fiber by the flight 17 can be suppressed.

Third Embodiment

Next, the configuration of a plasticizing screw for injection molding 10 (hereinafter simply referred to as a "screw 10" for brevity) related to a third embodiment of the invention will be described. If the screw 10 related to the third embodiment is compared with the screw 10 related to the first embodiment, only the configuration of the mixer is different. Since the other configurations are the same as those in the first embodiment, the same reference numerals are used and a description thereof is omitted here.

Figure 8:
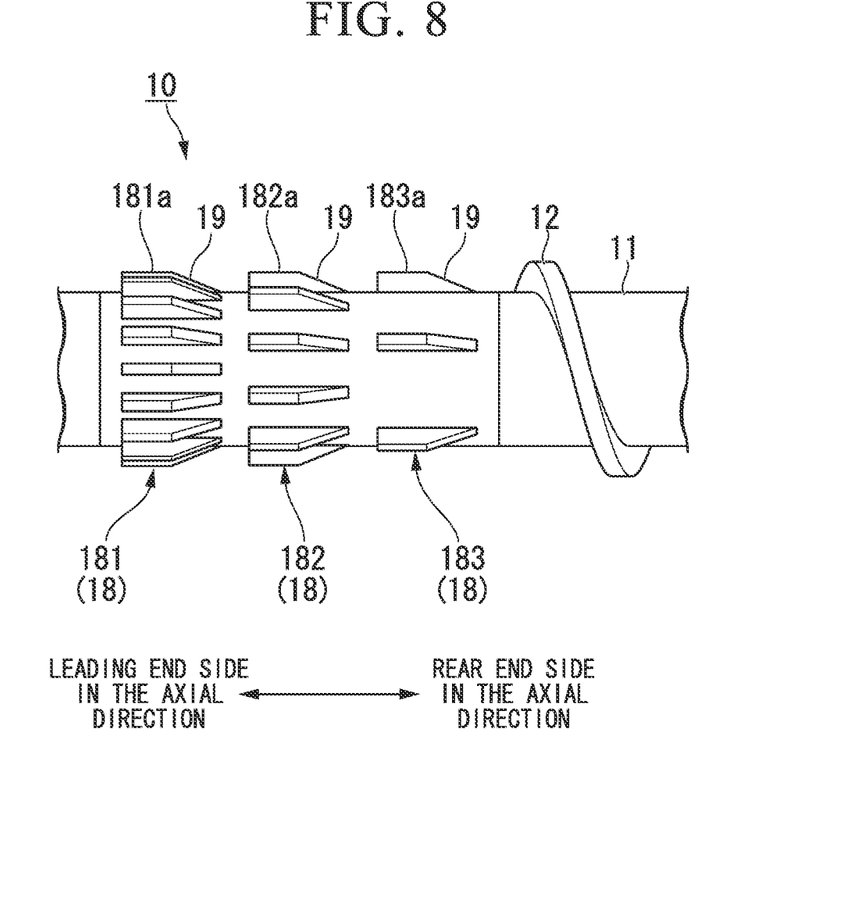
FIG. 8 is an enlarged schematic front view of a peripheral portion of a mixer regarding a screw related to a third embodiment of the invention.

Here, FIG. 8 is an enlarged schematic front view of a peripheral portion of a mixer 18 in the screw 10. The mixer 18 of this embodiment is the same as the mixer 13 of the first embodiment in that the mixer 18 is provided in three stages along the axial direction, thereby being provided with a first mixer 181, a second mixer 182, and a third mixer 183 toward the rear end side in the axial direction from the leading end side in the axial direction. However, in the mixer 18 of this embodiment, the shape of each of first fins 181a, second fins 182a, and third fins 183a constituting the first mixer 181, the second mixer 182, and the third mixer 183 is different from that of each of the first fins 131a, the second fins 132a, and the third fins 133a of the first embodiment.

More specifically, as shown in FIG. 8, an inclined surface 19 whose separation distance from the peripheral surface of the shaft 11 increases toward the leading end side in the axial direction from the rear end side in the axial direction is formed at a rear end portion in the axial direction of each of the first fins 181a to the third fins 183a of this embodiment.

In such a configuration, the thermoplastic resin entering the gaps between the tip end portions in the radial direction of the first fins 181a to the third fins 183a and the inner wall surface 421 of the injection cylinder 42 smoothly flows toward the leading end side in the axial direction from the rear end side in the axial direction by being guided by the inclined surfaces 19. Further, the lumps of the insufficiently melted thermoplastic resin flow along the inclined surface 19 or hit against the inclined surfaces 19, and is thereby broken. In this way, clogging of the gap with the thermoplastic resin can be prevented before it happens.

Fourth Embodiment

Next, the configuration of a plasticizing screw for injection molding 10 (hereinafter simply referred to as a "screw 10" for brevity) related to a fourth embodiment of the invention will be described. If the screw 10 related to the fourth embodiment is also compared with the screw 10 related to the first embodiment, only the configuration of the mixer is different. Since the other configurations are the same as those in the first embodiment, the same reference numerals are used and a description thereof is omitted here.

Although the details are not shown in the drawing, the mixer of this embodiment is provided in three stages along the axial direction similarly to the first embodiment, thereby being provided with a first mixer, a second mixer, and a third mixer toward the rear end side in the axial direction from the leading end side in the axial direction. Then, FIG. 9 is a schematic cross-sectional view showing a cross-section orthogonal to the axial direction of the screw 10 at the position of a second mixer 202.

Figure 9:
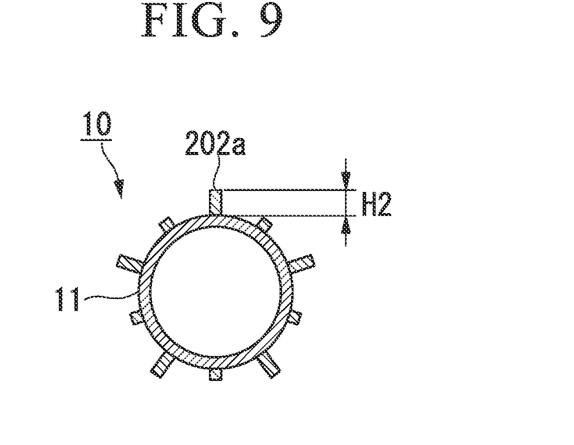
FIG. 9 is a schematic cross-sectional view showing a cross-section orthogonal to an axial direction of a screw at the position of a second mixer regarding a screw related to a fourth embodiment of the invention.

The second mixer 202 has ten second fins 202a which are provided to radially protrude from the peripheral surface of the shaft 11 and provided at regular intervals in the circumferential direction, as shown in FIG. 9. In the second fins 202a, protrusion heights H2 from the peripheral surface of the shaft 11 are different for the respective fins in the circumferential direction within a range lower than the protrusion height Hf of the flight 17 shown in FIG. 4.

According to such a configuration, even in a case where lumps of insufficiently melted resin having various sizes are present in the thermoplastic resin, large lumps are swept away by the second fins 202a in which gap thicknesses are large and the flow of the thermoplastic resin is strong. For this reason, even the large lumps are reliably deformed or finely broken by the second fins 202a having the protrusion heights H2 without causing clogging. In this way, dispersion of the reinforcement fibers in the thermoplastic resin is promoted.

In addition, although the details are not shown in FIG. 9, also with respect to the first fins and the third fins, protrusion heights H1 and H3 thereof from the shaft 11 have the same configuration as that of the second fin 202a and the same operation and effects are obtained.

EXAMPLES

Next, examples of the invention will be described. The applicant performed injection molding by using thermoplastic resin containing reinforcement fibers, with respect to a plurality of examples in which the conditions shown below were appropriately changed, and confirmed the quality of a molded product for each example.

(1) Injection molding machine used: 1050em-100 manufactured by Mitsubishi Heavy Industries Plastic Technology Co., Ltd., screw diameter: 90 mm (2) Thermoplastic resin feedstock used: polypropylene (PP)

(3) The reinforcement fiber: a glass fiber or a carbon fiber (4) The reinforcement fiber content ratio: 20% by weight or 30% by weight (5) The fiber length of the reinforcement fiber which is contained in the thermoplastic resin feedstock: 10 mm, 20 mm, or 25 mm (6) The shape of a molded product: a casing having an outer shape of 1000 mm×300 mm×15 mm and a thickness of 2 mm (7) Molding temperature: 230° C.

(8) Preheating temperature of the thermoplastic resin feedstock: 80° C.

(9) The weight-average fiber length of the reinforcement fiber: A test specimen of a square shape in a range of 60 mm square to 100 mm square is cut away from an optional place of a molded product. Then, the test specimen is heated for a given period of time at a temperature equal to or higher than the decomposition temperature of the thermoplastic resin, whereby a resin content is converted into ashes and removed, thereby making only the reinforcement fibers remain. Thereafter, the test specimen having only the reinforcement fibers is dispersed in an appropriate liquid medium and the lengths of 700 to 1000 reinforcement fibers are measured by using image processing or the like. Then, a weight-average fiber length is calculated from the measured lengths of individual reinforcement fibers by using the following expression. Here, in the expression, Li means the measured fiber length of the reinforcement fiber and Qi means the number of reinforcement fibers having a fiber length of Li.

[Weight-average fiber length]=$(\Sigma Qi \times Li^2)/(\Sigma Qi \times Li)$ (10) The degree of dispersion of the reinforcement fibers: If the degree of dispersion of fibers is poor, since a bundle of fibers is exposed on the surface of a molded product, evaluation of the degree of dispersion of fibers was evaluated into A, B, and C according to the external appearance states of the molded product.

A: There is no exposure of a bundle of fibers on the surface of the molded product and the glossiness of the surface of the molded product is high.

B: Although there is no exposure of a bundle of fibers on the surface of the molded product, the glossiness of the surface of the molded product is low.

C: A bundle of fibers is exposed on at least a portion of the surface of the molded product.

Here, the following Tables 1 to 4 show the test results regarding each example. According to the results of Examples 1 to 6, by carrying out the invention, even in a case where the states of the thermoplastic resin feedstock are different, and more specifically, even in a case where the presence or absence of preheating, the reinforcement fiber content ratio, or the fiber length of the reinforcement fiber is different, the weight-average fiber length of the reinforcement fiber in a molded product which is greater than or equal to 1.0 mm was obtained (generally, in a pellet containing reinforcement fibers, in order to obtain the long fiber-specific effect of improving mechanical strength, the weight-average fiber length of the reinforcement fiber which remains in a molded product needs to be greater than or equal to 1.0 mm).

TABLE 1

|  |  | Example 1 | Example 2 | Example 3 | Example 4 |
|---|---|---|---|---|---|
| Reinforcement fiber | Type | Glass | Glass | Carbon | Glass |
|  | Reinforcement fiber content ratio (% by weight) | 20 | 30 | 20 | 20 |
|  | Fiber length (mm) | 10 | 10 | 10 | 10 |
| Feedstock preheating |  | absence | absence | absence | presence |
| Number of stages of mixer (stages) |  | 3 | 3 | 3 | 3 |
| Number of fins (pieces) | Rearmost end mixer | 5 | 5 | 5 | 5 |
|  | Intermediate portion mixer | 10 | 10 | 10 | 10 |
|  | Leading edge mixer | 18 | 18 | 18 | 18 |
| Groove depth of mixer (mm) |  | 6 | 6 | 6 | 6 |
| Difference in protrusion height between fin and flight (mm) |  | presence | presence | presence | presence |
| Step of top portion of flight |  | presence | presence | presence | presence |
| Number of flights (piece) |  | 1 | 1 | 1 | 1 |
| Clogging with resin in mixer |  | absence | absence | absence | absence |
| Weight-average fiber length (mm) |  | 2.1 | 2.0 | 2.0 | 2.4 |
| Degree of dispersion of reinforcement fibers |  | A | A | A | A |

TABLE 2

|  |  | Example 5 | Example 6 | Example 7 | Example 8 |
|---|---|---|---|---|---|
| Reinforcement fiber | Type | Glass | Glass | Glass | Glass |
|  | Reinforcement fiber content ratio (% by weight) | 20 | 20 | 20 | 20 |
|  | Fiber length (mm) | 20 | 25 | 10 | 10 |

TABLE 2-continued

|  |  | Example 5 | Example 6 | Example 7 | Example 8 |
|---|---|---|---|---|---|
| Feedstock preheating | | absence | absence | absence | absence |
| Number of stages of mixer (stages) | | 3 | 3 | 4 | 2 |
| Number of fins (pieces) | Rearmost end mixer | 5 | 5 | 5 | 5 |
| | Intermediate portion mixer | 10 | 10 | 8/12 | — |
| | Leading edge mixer | 18 | 18 | 18 | 10 |
| Groove depth of mixer (mm) | | 6 | 6 | 6 | 6 |
| Difference in protrusion height between fin and flight (mm) | | presence | presence | presence | presence |
| Step of top portion of flight | | presence | presence | presence | presence |
| Number of flights (piece) | | 1 | 1 | 1 | 1 |
| Clogging with resin in mixer | | absence | absence | absence | absence |
| Weight-average fiber length (mm) | | 2.8 | 2.8 | 1.8 | 3.2 |
| Degree of dispersion of reinforcement fibers | | A | A | A | B |

TABLE 3

|  |  | Example 9 | Example 10 | Example 11 | Example 12 |
|---|---|---|---|---|---|
| Reinforcement fiber | Type | Glass | Glass | Glass | Glass |
| | Reinforcement fiber content ratio (% by weight) | 20 | 20 | 20 | 30 |
| | Fiber length (mm) | 10 | 10 | 10 | 10 |
| Feedstock preheating | | absence | absence | absence | absence |
| Number of stages of mixer (stages) | | 3 | 3 | 3 | 3 |
| Number of fins (pieces) | Rearmost end mixer | 3 | 2 | 5 | 5 |
| | Intermediate portion mixer | 7 | 4 | 10 | 10 |
| | Leading edge mixer | 12 | 18 | 18 | 18 |
| Groove depth of mixer (mm) | | 6 | 6 | 4 | 6 |
| Difference in protrusion height between fin and flight (mm) | | presence | presence | presence | presence |
| Step of top portion of flight | | presence | presence | presence | absence |
| Number of flights (piece) | | 1 | 1 | 1 | 1 |
| Clogging with resin in mixer | | absence | absence | small | absence |
| Weight-average fiber length (mm) | | 2.6 | 3.1 | 1.2 | 1.7 |
| Degree of dispersion of reinforcement fibers | | B~A | B | B~A | A |

TABLE 4

|  |  | Example 13 | Example 14 | Comparative Example 1 | Comparative Example 2 |
|---|---|---|---|---|---|
| Reinforcement fiber | Type | Glass | Glass | Glass | Glass |
| | Reinforcement fiber content ratio (% by weight) | 20 | 20 | 20 | 20 |
| | Fiber length (mm) | 10 | 10 | 10 | 10 |
| Feedstock preheating | | absence | presence | absence | absence |
| Number of stages of mixer (stages) | | 3 | 3 | — | 3 |
| Number of fins (pieces) | Rearmost end mixer | 5 | 5 | absence | 18 |
| | Intermediate portion mixer | 10 | 10 | absence | 18 |
| | Leading edge mixer | 18 | 18 | absence | 18 |

TABLE 4-continued

|  | Example 13 | Example 14 | Comparative Example 1 | Comparative Example 2 |
|---|---|---|---|---|
| Groove depth of mixer (mm) | 6 | 6 | — | 6 |
| Difference in protrusion height between fin and flight (mm) | absence | presence | — | presence |
| Step of top portion of flight | presence | presence | presence | presence |
| Number of flights (piece) | 1 | 2 | 1 | 1 |
| Clogging with resin in mixer | absence | absence | — | large |
| Weight-average fiber length (mm) | 1.5 | 1.0 | 3.8 | 0.5 |
| Degree of dispersion of reinforcement fibers | A | A | C | A |

In addition, if the results of Examples 5 and 6 are compared with each other, it is shown that if the fiber length of the reinforcement fiber which is contained in the thermoplastic resin feedstock exceeds 20 mm, the weight-average fiber length of the reinforcement fiber which remains in a molded product becomes constant. From this, in order to more clearly obtain the effects of the invention, it is preferable that the fiber length of the reinforcement fiber which is contained in the thermoplastic resin feedstock be greater than or equal to 1.0 mm and less than or equal to 20 mm.

Example 7 is for confirming the correlation between the number of stages of the mixer and the degree of dispersion of the reinforcement fibers. In Example 7, the mixer is provided in four stages along the axial direction. According to this Example 7, the weight-average fiber length of the reinforcement fiber in a molded product is greater than or equal to 1.0 mm in which the mechanical strength of a molded product is improved, as described above. However, compared with Example 1, the weight-average fiber length is slightly shorter. This is considered as being due to the fact that the number of stages of the mixer is large compared to Example 1, and thus a time during which the thermoplastic resin receives a shear force from the mixer or the number of times the thermoplastic resin receives a shear force from the mixer increases, whereby breakage of the reinforcement fibers proceeds.

Example 8 is also for confirming the correlation between the number of stages of the mixer and the degree of dispersion of the reinforcement fibers. In Example 8, the mixer is provided in two stages along the axial direction. According to this Example 8, the weight-average fiber length of the reinforcement fiber in a molded product is greater than or equal to 1.0 mm in which the mechanical strength of a molded product is improved, as described above, and is slightly longer even compared to Example 1. However, in this Example 8, the degree of dispersion of the reinforcement fibers is reduced compared to Example 1. This is considered as being due to the fact that the mixer provided on the most leading end side along the axial direction has only a small number of fins, compared to Example 1, and further, a mixer is not provided at an intermediate portion in the axial direction, whereby the effect of agitating the thermoplastic resin by the fins is reduced compared to Example 1.

Examples 9 and 10 are for confirming the correlation between the number of fins and the degree of dispersion of the reinforcement fibers. In Example 9, all the mixers have only a small number of fins, compared to Example 1. Further, in Example 10, other mixers except for the mixer provided on the most leading end side along the axial direction have only a small number of fins, compared to Example 1.

Therefore, a time during which the thermoplastic resin receives a shear force from the mixer or the number of times the thermoplastic resin receives a shear force from the mixer is reduced, whereby in Examples 9 and 10, the weight-average fiber length of the reinforcement fiber in a molded product is longer compared to Example 1. Further, the effect of agitating the thermoplastic resin by the fins is reduced compared to Example 1, whereby in Examples 9 and 10, the degree of dispersion of the reinforcement fibers is reduced compared to Example 1.

Example 11 is for confirming the correlation between the groove depth of the mixer and the degree of dispersion of the reinforcement fibers. In this Example 11, the groove depth of the mixer is made small compared to Example 1. In this case, from the fact that the tendency has been for variations to occur in plasticization measuring time, it is considered that it is easy for clogging with the thermoplastic resin to occur in a groove portion of the mixer. For this reason, since the flow rate of the thermoplastic resin is slow, a time during which the thermoplastic resin is placed in the screw is longer. In this way, a time during which the reinforcement fibers are kneaded and agitated by the flight and the mixer is long, and thus breakage of the reinforcement fibers proceeds, whereby it is considered that the weight-average fiber length of the reinforcement fiber in a molded product is shorter compared to Example 1.

Example 12 is for confirming the correlation between the presence or absence of the step in the tip end portion in the radial direction of the flight and the degree of dispersion of the reinforcement fibers. In this Example 12, a step is not provided at the tip end portion in the radial direction of the flight. In this case, the degree of dispersion of the reinforcement fibers is equivalent to that in Example 1. However, the weight-average fiber length of the reinforcement fiber in a molded product is shorter compared to Example 1. This is considered as being due to the fact that although the step provided at the tip end portion in the radial direction of the flight does not affect the kneading of the thermoplastic resin by the flight, in a case where the thermoplastic resin has entered the gap between the tip end portion in the radial direction of the flight and the inner wall surface of the injection cylinder, breakage of the reinforcement fibers contained in the thermoplastic resin is suppressed.

Example 13 is for confirming the correlation between a difference in protrusion height between the fin and the flight and the degree of dispersion of the reinforcement fibers. In this Example 13, the protrusion height of the fin and the protrusion height of the flight are set to be equal to each other. In this case, the degree of dispersion of the reinforcement fibers is equivalent to that in Example 1. This is considered as being due to the fact that even if a wide gap is formed between the tip end portion in the radial direction of the fin and the inner wall surface of the injection cylinder, the degree of agitation of the thermoplastic resin by the mixer is not affected.

On the other hand, in Example 13, the weight-average fiber length of the reinforcement fiber in a molded product is shorter compared to Example 1. This is considered as being due to the fact that in a case where the tip end portion in the radial direction of the flight is close to the inner wall surface of the injection cylinder to the extent of coming into contact therewith, since the tip end portion in the radial direction of the fin having the same diameter as the flight also comes into contact with the inner wall surface of the injection cylinder, if the thermoplastic resin enters the gap between the tip end portion in the radial direction of the fin and the inner wall surface of the injection cylinder, the reinforcement fibers are crushed by the tip end portion in the radial direction of the fin, and thus excessive breakage occurs in the reinforcement fibers.

Example 14 is for confirming the correlation between the number of flights and the degree of dispersion of the reinforcement fibers. In this Example 14, the mixer is combined with a double flight screw. In this case, the degree of kneading of the thermoplastic resin is improved by the double flight screw, and thus the degree of dispersion of the reinforcement fibers is high. However, it is found that the weight-average fiber length of the reinforcement fiber in a molded product is shorter compared to Example 1. This is considered as being due to the fact that since the reinforcement fibers are kneaded and agitated by the double flight screw and further kneaded and agitated in the mixer too, a frequency at which a shear force is loaded to the reinforcement fibers increases.

Comparative Example 1 is for confirming the degree of dispersion of the reinforcement fibers in a case of using a simple single flight screw having no mixer. In this case, since a shear force that the thermoplastic resin receives is reduced, the weight-average fiber length of the reinforcement fiber in a molded product is longer compared to Example 1. Further, since a mixer is not provided, an agitation effect at the time of plasticization is insufficient, and thus the degree of dispersion of the reinforcement fibers is reduced compared to Examples 1 to 14.

Comparative Example 2 is for confirming the degree of dispersion of the reinforcement fibers in a case where in a single flight screw in which the mixer is provided in three stages, eighteen fins are provided at all the mixers. In this case, the weight-average fiber length of the reinforcement fiber in a molded product is shorter compared to Example 1. This is considered as being due to the fact that clogging with the thermoplastic resin occurs in the groove portion of the mixer, and thus a plasticization time is long, whereby a time during which the thermoplastic resin is placed in the screw is long, that is, a time during which the reinforcement fibers are kneaded and agitated by the flight and the mixer becomes long, and thus excessive breakage occurs in the reinforcement fibers. In addition, as a cause of occurrence of the clogging with the thermoplastic resin in the groove portion of the mixer, it is considered that since the mixer provided on the rearmost end side has a large number of fins, the groove of the mixer is clogged with lumps of insufficiently melted resin, and thus transportation of molten resin is impeded.

INDUSTRIAL APPLICABILITY

The plasticizing screw for injection molding according to the invention includes the shaft, the flight, and the mixer. Then, the mixer is provided in plural stages in the axial direction, and the number of fins of the mixer of each stage increases toward the leading end side in the axial direction from the rear end side in the axial direction. Further, the protrusion height of each fin from the peripheral surface of the shaft is lower than the protrusion height of the flight from the peripheral surface of the shaft.

In such a configuration, since the protrusion height of each fin is lower than the protrusion height of the flight, even if the tip end portion in the radial direction of the flight approaches is close to the inner wall surface of the injection cylinder to the extent of coming into contact therewith, a wide gap is secured between the outer circumferential surface of the mixer and the inner wall surface of the injection cylinder. In this way, even if the thermoplastic resin enters the gap between the outer circumferential surface of the mixer and the inner wall surface of the injection cylinder, occurrence of excessive breakage in the reinforcement fibers can be prevented.

REFERENCE SIGNS LIST

1: injection molding machine
2: cavity
3: mold unit
4: injection unit
10: plasticizing screw for injection molding
11: shaft
12: flight
13: mixer
14: small-diameter shaft
15: screw tip
16: check ring
17: flight
18: mixer
19: inclined surface
31: fixed mold
32: movable mold
41: unit main body
42: injection cylinder
43: hopper
44: connecting shaft
45: motor
46: piston
47: hydraulic piping
131: first mixer
132: second mixer
133: third mixer
171: step portion
181: first mixer
182: second mixer
183: third mixer
202: second mixer
411: hydraulic oil cylinder
421: inner wall surface
131$a$: first fin
132$a$: second fin
133$a$: third fin
181$a$: first fin
182$a$: second fin
183$a$: third fin
202$a$: second fin
H1: protrusion height (first fin)
H2: protrusion height (second fin)
H3: protrusion height (third fin)
Hf: protrusion height (flight)
T: step length

The invention claimed is:

1. A plasticizing screw for injection molding that is installed in an injection molding machine which performs injection molding by plasticizing granular thermoplastic resin feedstock containing reinforcement fibers, the plasticizing screw for injection molding comprising:

a shaft which is rotationally driven;

a flight spirally provided on the peripheral surface of the shaft; and a mixer which is provided further to the leading end side in an axial direction than the flight and has a plurality of fins radially protruding from the peripheral surface of the shaft and provided in a circumferential direction, wherein the mixer is provided in plural stages in the axial direction and the number of fins of the mixer of each stage increases toward the leading end side in the axial direction from a rear end side in the axial direction, the protrusion height of each fin from the peripheral surface of the shaft is lower than the protrusion height of the flight from the peripheral surface of the shaft, the fiber length of the reinforcement fibers is greater than or equal to 1.0 mm and less than or equal to 20 mm, and wherein the mixer is provided in three or more stages in the axial direction, and the number of fins of the mixer of the first stage which is located on the rearmost end side in the axial direction is set to be N, the number of fins of the mixer of the second stage which is located next to the rear end side of the first stage in the axial direction is in a range of more than 1.5N and less than 2.5N, and the number of fins of the mixer of the third stage or later which is located further to the leading end side in the axial direction than the second stage is more than 3N.

2. The plasticizing screw for injection molding according to claim 1, wherein a step in a radial direction is provided at a tip end portion in the radial direction of the flight such that a screw leading-end side of the step is lowered.

3. The plasticizing screw for injection molding according to claim 2, wherein the protrusion heights of the fins from the peripheral surface of the shaft are different for the respective fins in the circumferential direction.

4. The plasticizing screw for injection molding according to claim 2, wherein an inclined surface whose separation distance from the peripheral surface of the shaft increases toward the leading end side in the axial direction from the rear end side in the axial direction is formed at a rear end portion in the axial direction of the fin.

5. The plasticizing screw for injection molding according to claim 1, wherein the protrusion heights of the fins from the peripheral surface of the shaft are different for the respective fins in the circumferential direction.

6. The plasticizing screw for injection molding according to claim 1, wherein an inclined surface whose separation distance from the peripheral surface of the shaft increases toward the leading end side in the axial direction from the rear end side in the axial direction is formed at a rear end portion in the axial direction of the fin.

7. The plasticizing screw for injection molding according to claim 1, wherein a radial distance from a valley portion of the fin to a tip end portion in the radial direction of the flight is a size greater than or equal to twice the outer diameter of the granular thermoplastic resin feedstock.

8. The plasticizing screw for injection molding according to claim 1, wherein the flight is a single flight which forms only one line is provided on the peripheral surface of the shaft.

9. An injection molding method comprising:

a process of plasticizing thermoplastic resin feedstock containing reinforcement fibers by using a plasticizing screw for injection molding; and a process of injecting the plasticized thermoplastic resin feedstock into a cavity of a mold, wherein the plasticizing screw for injection molding is a plasticizing screw for injection molding which includes a shaft which is rotationally driven, a flight spirally provided on the peripheral surface of the shaft, and a mixer which is provided further to the leading end side in an axial direction than the flight and has a plurality of fins radially protruding from the peripheral surface of the shaft and provided in a circumferential direction, wherein the mixer is provided in plural stages in the axial direction and the number of fins of the mixer of each stage increases toward the leading end side in the axial direction from a rear end side in the axial direction, the protrusion height of each fin from the peripheral surface of the shaft is lower than the protrusion height of the flight from the peripheral surface of the shaft, the fiber length of the reinforcement fibers is greater than or equal to 1.0 mm and less than or equal to 20 mm, and wherein the mixer is provided in three or more stages in the axial direction, and the number of fins of the mixer of the first stage which is located on the rearmost end side in the axial direction is set to be N, the number of fins of the mixer of the second stage which is located next to the rear end side of the first stage in the axial direction is in a range of more than 1.5N and less than 2.5N, and the number of fins of the mixer of the third stage or later which is located further to the leading end side in the axial direction than the second stage is more than 3N.

10. The injection molding method according to claim 9, wherein the reinforcement fiber includes at least one of a glass fiber, a carbon fiber, a metal fiber, and a natural fiber.

* * * * *